(12) United States Patent
Hemphill

(10) Patent No.: US 9,906,096 B2
(45) Date of Patent: Feb. 27, 2018

(54) ECCENTRIC LEADSCREW ACTUATOR

(71) Applicant: Schaeffler Technologies AG & Co. KG, Herzogenaurach (DE)

(72) Inventor: Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 400 days.

(21) Appl. No.: 14/698,235

(22) Filed: Apr. 28, 2015

(65) Prior Publication Data

US 2016/0322883 A1  Nov. 3, 2016

(51) Int. Cl.
*H02K 7/116* (2006.01)
*H02K 7/06* (2006.01)

(52) U.S. Cl.
CPC ............... *H02K 7/116* (2013.01); *H02K 7/06* (2013.01)

(58) Field of Classification Search
CPC ......... H02K 7/06; H02K 7/116; H02K 7/1163
USPC .............................................................. 310/83
See application file for complete search history.

(56) References Cited

U.S. PATENT DOCUMENTS

| 2,881,619 | A | * | 4/1959 | Fox | ............................ | F16H 1/32 |
| | | | | | | 376/228 |
| 4,393,319 | A | * | 7/1983 | Bock | ...................... | F16K 31/048 |
| | | | | | | 310/156.12 |
| 4,484,093 | A | * | 11/1984 | Smith | ....................... | G21C 7/12 |
| | | | | | | 310/14 |
| 5,024,124 | A | | 6/1991 | Popov et al. | | |
| 5,030,866 | A | | 7/1991 | Kawai | | |
| 5,053,660 | A | * | 10/1991 | Sneddon | .................. | F16H 25/20 |
| | | | | | | 251/129.11 |
| 5,831,360 | A | * | 11/1998 | Senjo | ...................... | H02K 1/185 |
| | | | | | | 310/80 |
| 6,211,591 | B1 | * | 4/2001 | Kowalski | ................ | B25B 21/00 |
| | | | | | | 310/112 |
| 7,396,307 | B2 | * | 7/2008 | Hazama | ..................... | F16H 1/32 |
| | | | | | | 475/149 |
| 7,922,181 | B2 | * | 4/2011 | Hakui | ................... | B60G 15/063 |
| | | | | | | 267/175 |
| 2011/0304231 | A1 | * | 12/2011 | Wu | ...................... | F16H 25/2025 |
| | | | | | | 310/78 |
| 2012/0019082 | A1 | * | 1/2012 | Won | ...................... | H02K 5/1732 |
| | | | | | | 310/49.01 |
| 2012/0153756 | A1 | * | 6/2012 | Lee | .......................... | H02K 7/06 |
| | | | | | | 310/83 |
| 2012/0176007 | A1 | * | 7/2012 | Takeuchi | ................ | H02K 7/116 |
| | | | | | | 310/68 B |

(Continued)

*Primary Examiner* — Alex W Mok
(74) *Attorney, Agent, or Firm* — Volpe and Koenig, P.C.

(57) ABSTRACT

An improved actuator assembly including an eccentric leadscrew actuator assembly with a housing having a stator and a plurality of coils is provided. A rotor is arranged radially inwardly from the stator and includes a first threading on a radially inner surface. A shaft is arranged in a fixed axial position and radially inwardly from the rotor, and includes a second threading on a radially outer surface that engages the first threading of the rotor. A bearing assembly is fixed to the rotor, and the bearing assembly supports an eccentric ring connected to the rotor. The rotor rotates eccentrically around the shaft based on energization of the plurality of coils of the stator. The rotor is axially displaceable by rotation thereof via rolling engagement of the first threading of the rotor and the second threading of the shaft along an axially extending tangent line.

16 Claims, 4 Drawing Sheets

(56) References Cited

U.S. PATENT DOCUMENTS

| | | | | |
|---|---|---|---|---|
| 2012/0210810 A1* | 8/2012 | Nakamura | ........... | F16H 25/2238 |
| | | | | 74/89.34 |
| 2013/0056660 A1* | 3/2013 | Roby | ................ | F01P 7/14 |
| | | | | 251/129.11 |
| 2013/0119786 A1* | 5/2013 | Muramatsu | ............. | F16H 25/20 |
| | | | | 310/12.27 |
| 2014/0026696 A1* | 1/2014 | Hyun | ................. | H02K 1/2733 |
| | | | | 74/116 |
| 2014/0035443 A1* | 2/2014 | Furukawa | ............... | B30B 1/186 |
| | | | | 310/68 B |
| 2014/0105768 A1* | 4/2014 | Franz | ................ | F04B 9/02 |
| | | | | 417/415 |
| 2014/0125172 A1* | 5/2014 | Hsieh | ................. | H02K 21/145 |
| | | | | 310/80 |
| 2014/0190293 A1* | 7/2014 | Lee | ................ | H02K 5/161 |
| | | | | 74/89.23 |
| 2014/0290402 A1* | 10/2014 | Yamasaki | ............. | H02K 29/06 |
| | | | | 74/89.23 |
| 2014/0312724 A1* | 10/2014 | Hung | ................. | H02K 7/1166 |
| | | | | 310/78 |
| 2015/0015104 A1* | 1/2015 | Kataoka | ................. | H02K 7/06 |
| | | | | 310/80 |
| 2015/0097455 A1* | 4/2015 | Ueyama | ................. | H02K 7/06 |
| | | | | 310/80 |
| 2015/0288249 A1 | 10/2015 | Hemphill et al. | | |

* cited by examiner

ECCENTRIC LEADSCREW ACTUATOR

FIELD OF INVENTION

This invention is generally related to an actuator assembly, and is more particularly related to an eccentric leadscrew actuator assembly.

BACKGROUND

Leadscrew actuators are used in a variety of applications where a load is required to be selectively displaced in a linear manner, including clutch actuator assemblies. One type of known actuator assembly includes a stator arranged within a housing and a rotor arranged concentrically between the stator and a threaded shaft or screw. The stator includes a plurality of coils that are energized to cause the rotational motion of the rotor. The rotor includes threading that mates with the threaded shaft or screw, and the rotor travels axially along the threaded shaft or screw to engage an actuation element, such as a clutch assembly actuator flange. There is an increased demand to minimize the space requirements for actuator assemblies and reduce production costs while simultaneously increasing performance, i.e. providing a higher efficiency and drive ratio. One known type of actuator assembly includes a planetary gear and ball screw. These known types of actuator assemblies provide improved performance but are expensive due to their complex transmission ratio components.

It would be desirable to provide an actuator assembly including a configuration that provides a high efficiency and includes a simplified construction that minimizes costs.

SUMMARY

An improved actuator assembly is provided that includes an eccentric drive component and increases efficiency while minimizing the production costs and complexity of the required components. The improved actuator assembly includes an eccentric leadscrew actuator assembly including a housing having a stator with a plurality of coils. A rotor is arranged radially inwardly from the stator and includes a sleeve body and a first threading on a radially inner surface of the sleeve body. A shaft is arranged in a fixed axial position radially inwardly from the rotor, and the shaft includes a second threading on a radially outer surface. A bearing assembly is fixed to the rotor, and the bearing assembly supports an eccentric ring connected to the rotor. The rotor rotates eccentrically around the shaft based on energization of the plurality of coils of the stator. The rotor is axially displaceable by rotation thereof via rolling engagement of the first threading of the rotor with the second threading of the shaft along an axially extending tangent line.

In another embodiment of the eccentric leadscrew actuator assembly, the shaft is eccentric component instead of the rotor. In this embodiment, the housing includes a stator having a plurality of coils, and a rotor is arranged in a fixed axial position and radially inwardly from the stator. The rotor includes a sleeve body and a first threading on a radially inner surface of the sleeve body. A shaft is arranged radially inwardly from the rotor and includes a second threading on a radially outer surface. A bearing assembly is fixed to the shaft, and supports the shaft eccentrically relative to an axis of the rotor. The rotor is rotatable by energization of the plurality of coils of the stator, and the shaft is axially displaceable by rotation of the rotor via rolling engagement of the first threading of the rotor with the second threading of the shaft along an axially extending tangent line.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
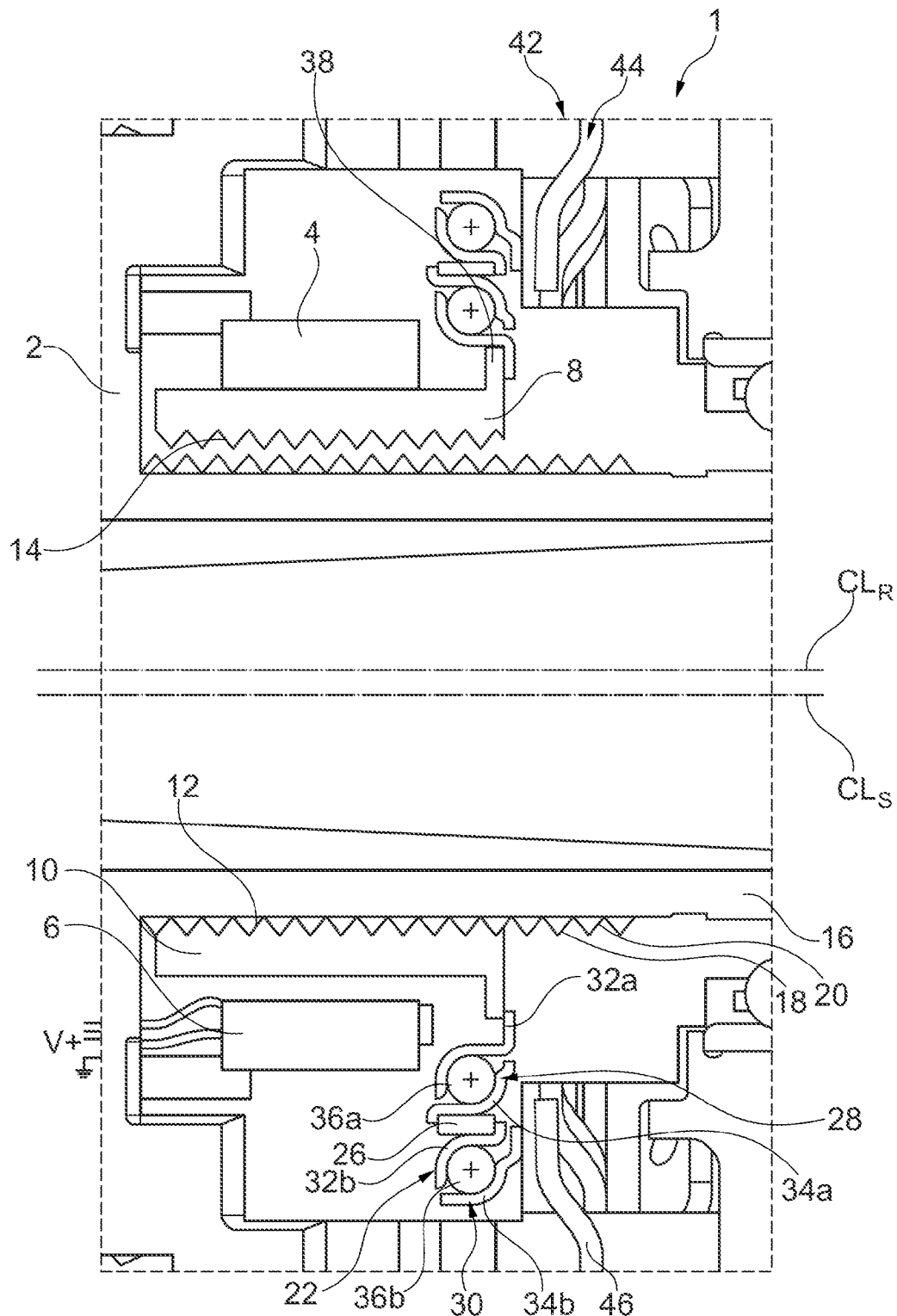
FIG. 1 is a side cross-sectional view of an eccentric leadscrew actuator assembly according to a first embodiment of the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

As shown in FIG. 1, an eccentric leadscrew actuator assembly 1 including an eccentric leadscrew actuator is provided. The eccentric leadscrew actuator assembly 1 includes a housing 2 and a stator 4 having a plurality of coils 6. A rotor 8 is arranged radially inwardly from the stator 4 and includes a sleeve body 10 and a first threading 12 on a radially inner surface 14 of the sleeve body 10. A shaft 16 is arranged in a fixed axial position and radially inwardly from the rotor 8 and includes a second threading 18 on a radially outer surface 20. In one embodiment, the shaft 16 is fixed to the housing 2. A bearing assembly 22 is fixed to the rotor 8. The bearing assembly 22 supports an eccentric ring 26 connected to the rotor 8. The rotor 8 rotates eccentrically around the shaft 16 based on energization of the plurality of coils 6 of the stator 4 due to the eccentric ring 26. The plurality of coils 6 of the stator 4 are selectively energized to rotate the rotor 8. The rotor 8 is axially displaceable by rotation thereof via rolling engagement of the first threading 12 of the rotor 8 and the second threading 18 of the shaft along an axially extending tangent line. The rolling engagement between the first threading 12 and the second threading 18 can provide a higher transmission ratio than previously known leadscrew arrangements which lack an eccentric component. As shown in FIG. 1, a centerline ($CL_R$) of the rotor 8 is offset from a centerline ($CL_S$) of the stator 4 due to the eccentric ring 26.

The bearing assembly 22 preferably includes a first bearing 28 and a second bearing 30, and the first and second bearings 28, 30 each include a radially inner ring 32a, 32b, a radially outer ring 34a, 34b, and rolling elements 36a, 36b. In the embodiment shown in FIG. 1, the rolling elements 36a, 36b include spherical rolling elements, although other types of rolling elements could be used. One of ordinary skill in the art will recognize that a variety of configurations of bearing assemblies can be used in the eccentric leadscrew actuator assembly 1. In one embodiment, the eccentric ring 26 is connected between the radially outer ring 34a of the first bearing 28 and the radially inner ring 32b of the second bearing 30. The sleeve body 10 of the rotor 8 preferably includes a radially extending flange 38, and the radially extending flange 38 is fixed to the radially inner ring 32a of the first bearing 28.

Figure 4:
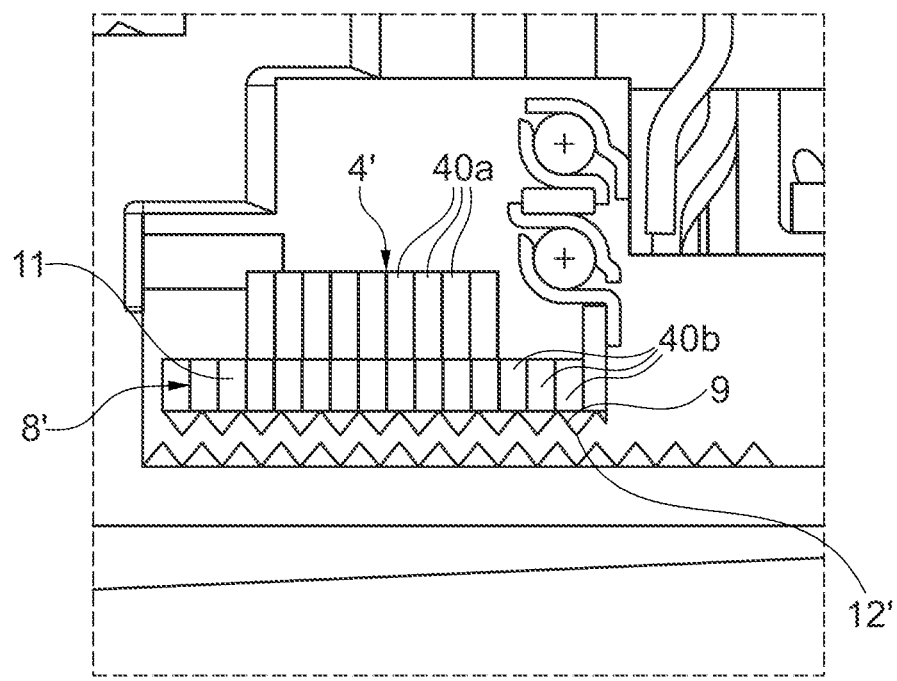
FIG. 4 is a partial side cross-sectional view of an eccentric leadscrew actuator assembly according to a fourth embodiment of the invention.

In one embodiment shown in FIG. 4, the stator 4' is comprised of a plurality of laminated iron plates 40a and the rotor 8' is comprised of a plurality of laminated iron plates 40b. In this embodiment, the rotor 8' includes a body portion 9 including a first threading 12', and a separately formed sleeve portion 11 including the plurality of laminated iron plates 40b.

In one embodiment, the first threading 12 of the rotor 8 is comprised of a different material than sleeve body 10 of the rotor 8. In one embodiment, the first threading 12 is formed from steel and the sleeve body 10 is formed from iron. One of ordinary skill in the art will recognize that alternative materials can be used for the stator 4 or the rotor 8.

In one embodiment shown in FIG. 1, a clutch actuator assembly 42 including the eccentric leadscrew actuator assembly 1 is provided. A clutch assembly 44 is arranged adjacent to the bearing assembly 22 and includes radially extending flanges 46 engaged against the bearing assembly 22. The axial movement of the rotor 8 against the bearing assembly 22 causes axial movement of the radially extending flanges 46 of the clutch assembly 44, thereby causing the clutch to engage or disengage. One of ordinary skill in the art would recognize that this actuator arrangement can be used in any application that requires displacement of a component for actuation.

In another embodiment, an eccentric leadscrew actuator assembly 50 including an eccentrically supported shaft 52 is provided. The eccentric leadscrew actuator assembly 50 includes a housing 54 including a stator 56 having a plurality of coils 58. A rotor 60 is arranged in a fixed axial position and radially inwardly from the stator 56 and includes a sleeve body 62 and a first threading 64 on a radially inner surface 66 of the sleeve body 62. In one embodiment, the rotor 60 is supported by the housing 54. The eccentrically supported shaft 52 is arranged radially inwardly from the rotor 60 and includes a second threading 68 on a radially outer surface 70. A bearing assembly 72 is fixed to the radially outer surface 70 of the shaft 52. The bearing assembly 72 includes an eccentric ring 74. The shaft 52 is arranged eccentrically within the rotor 60 and is axially displaceable by rotation of the rotor 60 based on energization of the plurality of coils 58 of the stator 56 via rolling engagement of the first threading 64 of the rotor 60 and the second threading 68 of the shaft 52 along an axially extending tangent line. The shaft 52 is axially displaceable to drive an actuation component or load.

Figure 2:
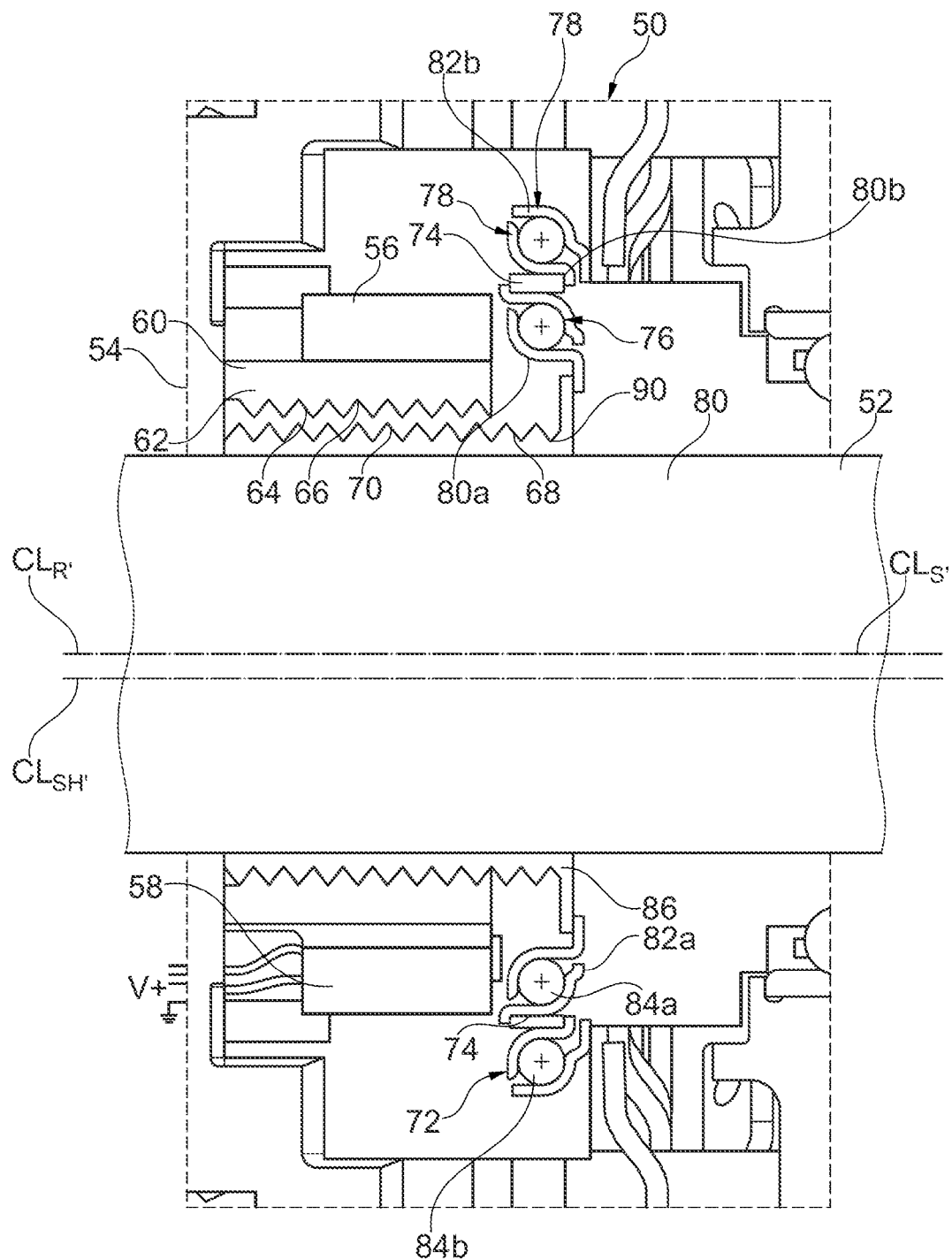
FIG. 2 is a side cross-sectional view of an eccentric leadscrew actuator assembly according to a second embodiment of the invention.

In one embodiment, the bearing assembly 72 includes a first bearing 76 and a second bearing 78, and the first and second bearings 76, 78 each include a radially inner ring 80a, 80b, a radially outer ring 82a, 82b, and rolling elements 84a, 84b. The eccentric ring 74 is connected between the radially outer ring 82a of the first bearing 76 and the radially inner ring 80b of the second bearing 78. In one embodiment shown in FIG. 2, the shaft 52 includes a radially extending flange 86, and the radially extending flange 86 is fixed to the radially inner ring 80a of the first bearing 76.

By supporting the shaft 52 with the eccentric ring 74, a centerline ($CL_{SH'}$) of the shaft 52 is offset from centerlines ($CL_{R'}$, $CL_{S'}$) of the rotor 60 and the stator 56. In one embodiment, the shaft 52 includes a body portion 88 and an insert 90 fixed to the body portion 88, and the second threading 68 and the flange 86 are arranged on the insert 90.

Figure 3:
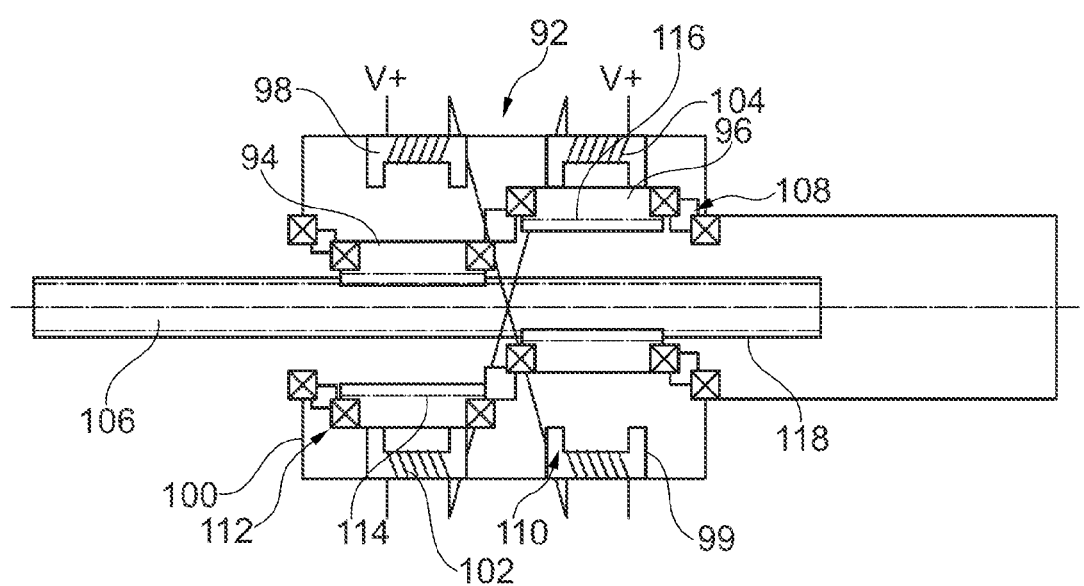
FIG. 3 is a schematic side view of an eccentric leadscrew actuator assembly according to a third embodiment of the invention.

In another embodiment of an eccentric leadscrew actuator assembly 92, shown schematically in FIG. 3, two rotors 94, 96 are provided for an axially displaceable shaft 106, and stators 98, 99 are arranged on a housing 100. The stators 98, 99 includes coils 102, 104 arranged on alternate sides thereof that are wired together to provide alternate magnetic fields. In the embodiment of FIG. 3, a first bearing assembly 108, a second bearing assembly 110, and a third bearing assembly 112 are provided. The second bearing assembly 110 is provided between the stators 94, 96, and the first bearing assembly 108 and third bearing assembly 112 each support a respective one of the rotors 94, 96. In order to provide an eccentricity for the rotors 94, 96 with respect to the shaft 106, any one or more of the bearing assemblies 108, 110, 112 includes an eccentric ring. The threads of the rotors 94, 96 engage the threaded shaft 106 along axially extending tangent lines that are preferably spaced apart 180° from one another to provide a balanced loading of the shaft 106. Energization of the coils 102, 104 causes the rotors 94, 96 to rotate, with rolling engagement of the rotor threads 114, 116 with the shaft threads 118 along the oppositely located axially extending tangent lines causing axial displacement of the shaft 106.

Having thus described various embodiments of the present eccentric leadscrew actuator assembly in detail, it is to be appreciated and will be apparent to those skilled in the art that many changes, only a few of which are exemplified in the detailed description above, could be made in the device without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An eccentric leadscrew actuator assembly comprising:
    a housing including a stator having a plurality of coils;
    a rotor arranged radially inwardly from the stator and including a sleeve body and a first threading on a radially inner surface of the sleeve body;
    a shaft arranged in a fixed axial position and radially inwardly from the rotor and including a second threading on a radially outer surface;
    a bearing assembly fixed to the rotor, the bearing assembly supporting the rotor eccentrically to the shaft; and
    the rotor rotates eccentrically around the shaft based on energization of the plurality of coils of the stator, the rotor is axially displaceable by rotation thereof via rolling engagement of the first threading of the rotor and the second threading of the shaft along an axially extending tangent line.

2. The eccentric leadscrew actuator assembly of claim 1, wherein a centerline of the rotor is offset from a centerline of the stator.

3. The eccentric leadscrew actuator assembly of claim 1, wherein the bearing assembly includes a first bearing and a second bearing, and the first and second bearings each include a radially inner ring, a radially outer ring, and rolling elements.

4. The eccentric leadscrew actuator assembly of claim 3, wherein an eccentric ring is connected between the radially outer ring of the first bearing and the radially inner ring of the second bearing.

5. The eccentric leadscrew actuator assembly of claim 3, wherein the sleeve body of the rotor includes a flange, and the flange is fixed to the radially inner ring of the first bearing.

6. The eccentric leadscrew actuator assembly of claim 1, wherein the stator and the rotor are each comprised of a plurality of laminated iron plates.

7. The eccentric leadscrew actuator assembly of claim 1, wherein the first threading of the rotor is comprised of a different material than a body of the rotor.

8. A clutch actuator assembly comprising the eccentric leadscrew actuator assembly of claim 1, and a clutch assembly including radially extending flanges, wherein axial movement of the rotor against the bearing assembly causes axial movement of the radially extending flanges of the clutch assembly.

9. An eccentric leadscrew actuator assembly comprising:
a housing including a stator having a plurality of coils;
a rotor arranged in a fixed axial position and radially inwardly from the stator and including a sleeve body and a first threading on a radially inner surface of the sleeve body;
a shaft arranged radially inwardly from the rotor and including a second threading on a radially outer surface;
a bearing assembly eccentrically supports the shaft relative to an axis of the rotor; and
the rotor is rotatable by energization of the plurality of coils of the stator, and the shaft is axially displaceable by rotation of the rotor via rolling engagement of the first threading of the rotor and the second threading of the shaft along an axially extending tangent line.

10. The eccentric leadscrew actuator assembly of claim 9, wherein a centerline of the shaft is offset from centerlines of the rotor and the stator.

11. The eccentric leadscrew actuator assembly of claim 9, wherein the bearing assembly includes a first bearing and a second bearing, and the first and second bearings each include a radially inner ring, a radially outer ring, and rolling elements.

12. The eccentric leadscrew actuator assembly of claim 11, wherein an eccentric ring is connected between the radially outer ring of the first bearing and the radially inner ring of the second bearing.

13. The eccentric leadscrew actuator assembly of claim 11, wherein the shaft includes a flange, and the flange is fixed to the radially inner ring of the first bearing.

14. The eccentric leadscrew actuator assembly of claim 13, wherein the shaft includes a body portion and an insert fixed to the body portion, and the second threading and the flange are arranged on the insert.

15. An eccentric leadscrew actuator assembly comprising:
a housing including a stator having a plurality of coils;
at least one rotor arranged in a fixed axial position and radially inwardly from the stator and including a sleeve body and a first threading on a radially inner surface of the sleeve body;
a shaft arranged radially inwardly from the at least one rotor and including a second threading on a radially outer surface;
a bearing assembly eccentrically supports the shaft relative to an axis of the at least one rotor; and
the at least one rotor is rotatable by energization of the plurality of coils of the stator, and the shaft is axially displaceable by rotation of the at least one rotor via rolling engagement of the first threading of the at least one rotor and the second threading of the shaft along an axially extending tangent line.

16. The eccentric leadscrew actuator assembly of claim 15, further comprising two rotors arranged axially adjacent to each other and each including a first threading, the two rotors are each rotatable by energization of the plurality of coils of the stator, and the shaft is axially displaceable by rotation of the two rotors via rolling engagement of the first threadings of the two rotors with the second threading of the shaft along axially extending tangent lines that are spaced apart by 180° about an axis of the shaft.

* * * * *